March 15, 1966   C. W. BOGS ETAL   3,241,150
SEISMIC DATA PRESENTATION
Filed Dec. 16, 1963

INVENTORS.
ROBERT F. GREGORY,
CHARLES W. BOGS,
BY
John D. Schneider
ATTORNEY.

United States Patent Office 3,241,150
Patented Mar. 15, 1966

3,241,150
SEISMIC DATA PRESENTATION
Charles W. Bogs, Houston, Tex., and Robert F. Gregory, Denver, Colo., assignors to Humble Oil & Refining Company
Filed Dec. 16, 1963, Ser. No. 331,027
3 Claims. (Cl. 346—33)

The present invention relates generally to the display of electrical transients. In particular, it concerns the presentation of seismic data in which both the cycle breadth and amplitude parameters of a seismic signal are simultaneously recorded photographically. The cycle breadth information is presented in different colors which correspond to different lengths of cycle breadth and the amplitude information is presented in variable area.

As is well known in geophysical prospecting, a seismic shock is imparted to the earth generally by means of an explosion and seismic waves generated by the explosion travel downwardly through the subsurface and are reflected back to the surface by subterranean strata. These waves are detected at spaced points on the earth's surface which are at selected distances from the explosion point, termed the "shock" point. The depth of subsurface reflecting strata can be determined by measuring the time intervals between initiation of the explosion and detection of the reflected waves at the detection points. Various corrections may be made to adjust the arrival times of the reflected waves to compensate, for example, for differences in elevation of the shock point and the various detecting points, and to compensate for the low velocity layer of the earth at the several points.

Amplitude, frequency, total energy, and other parameters of the seismic signals aid observers in determining the characteristics of subsurface structures. Also, various techniques have been used to present the signals in forms that are easier to analyze. One such technique is the display of the signals in variable density or variable color where the signals are reproduced as photographic traces which vary in intensity in proportion to variations in amplitude or frequency or some other parameter of the signals.

The photographic technique is used in the present invention to present two parameters of the seismic signal, cycle breadth and amplitude, together. The combination of these two parameters results in a display in which the colors of recorded blocks change with cycle breadth variation and the size of the area occupied by each color block varies with amplitude. The selection of the colors, their number and intensity, is arbitrary. The units of cycle breadth that each color represents also is arbitrary.

The record made in accordance with the teachings of the invention presents frequency and cycle breadth information better than they have been presented heretofore. Undesirable, low amplitude noise, characteristic of cycle breadth information, is eliminated permitting the observer to interpret and analyze better the seismic signals in order to gain information as to the nature of the subsurface formations such as porosity, bed thickness, slope, velocity, etc.

Briefly, the invention comprises a method for recording a seismic signal as a photographic trace, the color of which varies in accordance with changes in cycle breadth and the area of which varies with amplitude of the seismic signal. The apparatus of the invention and its operation is as follows. Two separate, moving coil galvanometers, one of which pivots in response to cycle breadth voltage and the other of which pivots in response to amplitude voltage of the seismic signal are both focused on a white light source and adjusted to impinge overlayed images of this light source on a common area of color-sensitive film which is mounted on a rotatable drum. An array of different, transparent colors which form a mask are placed between the light source and the cycle breadth galvanometer in a manner such that changes in the cycle breadth voltages produce variations in the color of the light projected to the color film. An opaque strip provided with a narrow, transparent slit is positioned between the light source and the amplitude galvanometer in a manner such that at zero voltage a beam of clear, white light is focused to impinge on the film. The color mask may be of the type described in U.S. patent application Serial No. 136,581, entitled "Recording Mode and Apparatus for Seismic Data," filed Sept. 7, 1961, by W. A. Alexander.

A primary object, then, of the present invention is to provide an improved method and apparatus for displaying seismic signal, cycle breadth, and amplitude information. A further object of the present invention is to provide an improved method and apparatus for displaying seismic signal cycle breadth information which eliminates low amplitude noise.

The term "frequency" as used herein means the number of times a signal wave form or seismic signal crosses the zero signal axis per unit of time. The term "positive zero crossing" means the crossing of a zero signal axis by the signal wave form when the wave form changes from negative to positive and "negative zero crossing" means the point where the seismic signal crosses the zero signal axis and changes from a positive to a negative value. The term "half cycle breadth" means the distance representative of time between any two negative-positive or positive-negative successive zero crossings. The term "full cycle breadth" means the distance representative of time between two successive, positive zero crossings, or two successive, negative zero crossings.

The circuit for producing the half cycle breadth signal is the same as the one described in U.S. patent application Serial No. 227,284, now Patent No. 3,193,832 entitled "Seismic Presentation" by K. O. Heintz. The present invention combines two of these half cycle breadth circuits to produce the full cycle breadth signal.

The above object and other objects as well as the advantages of the invention will be apparent from the following, more detailed description thereof when taken with the drawings wherein.

Figure 1:
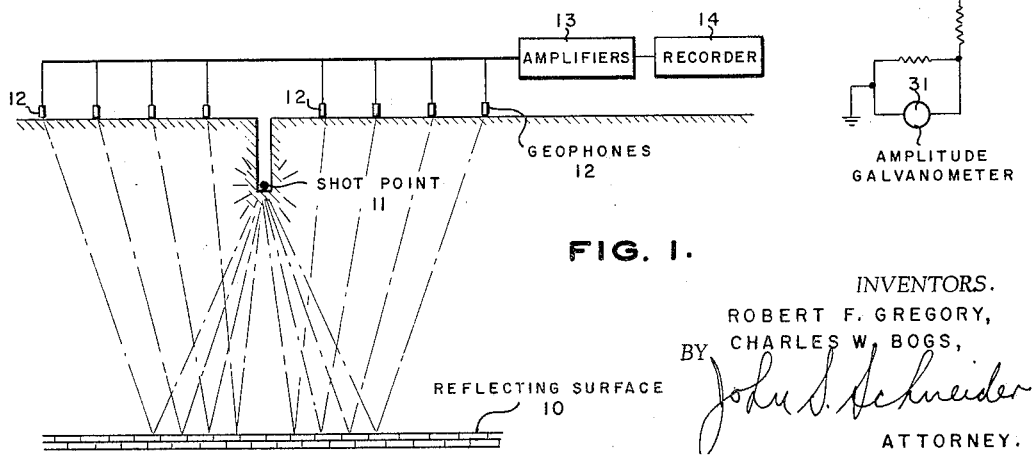
FIG. 1 is a schematic representation of a profile of the earth's subsurface illustrating the manner in which the original signals are obtained.

In FIG. 1 there is shown a reflecting subsurface 10, a shot point 11, and surface pickups or geophones 12. The geophones or transducers 12 translate the reflected shock waves resulting from the explosion at shock point 11 into electrical signals representative of the seismic waves. The electrical signals are amplified by amplifiers 13 and recorded as indicated at 14.

Figure 2:
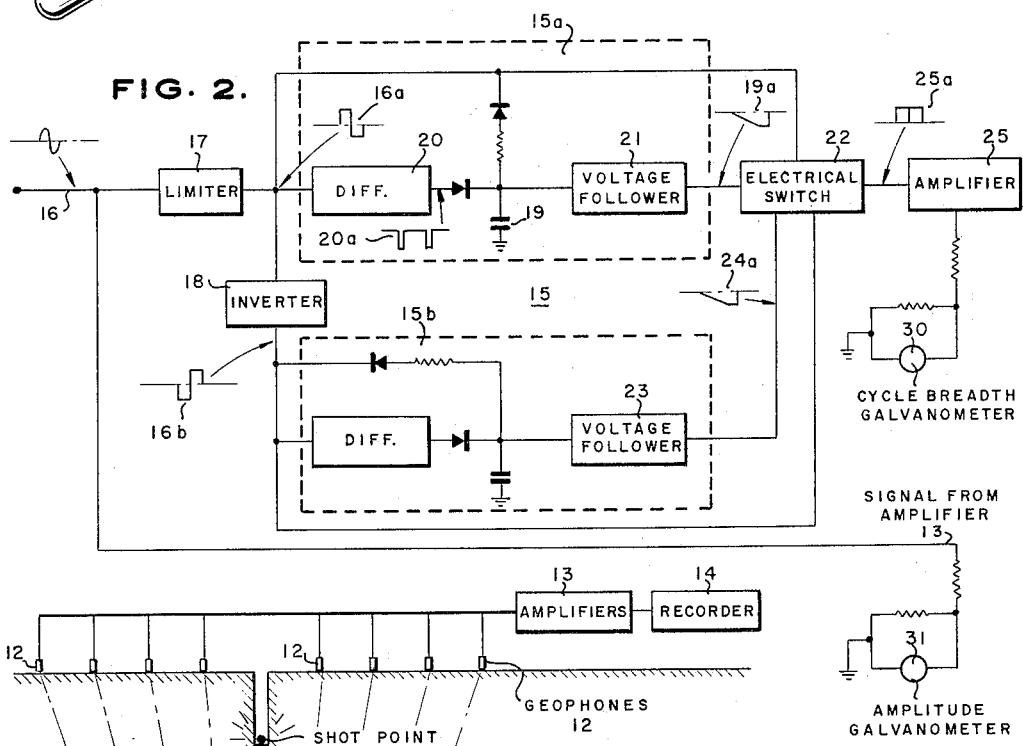
FIG. 2 is a schematic illustration of the electrical circuits used to form the cycle breadth signal and to transmit both the amplitude and cycle breadth signals to their respective galvanometers.

Referring to FIG. 2, the amplified electrical signals produced by the reflected shock waves resulting from the explosion at the shock point are fed to a cycle breadth detector circuit generally designated 15. The operation of the cycle breadth detector shown in the block diagram of FIG. 2 is as follows. The amplified seismic input signal 16 is clipped in the limiter 17, and the squared voltage signal 16a is fed to identical shaping circuits 15a and 15b. The signal sent to circuit 15b is first inverted by inverter 18 as indicated at 16b. In circuit 15a, square wave 16a builds up a charge on a capacitor 19 during one-half cycle of the seismic signal which is held during the other half of the cycle as seen at 19a by the capacitor 19 and is discharged by a pulse 20a from the differentiator 20 at the zero crossing time preceding the next cycle. This voltage is transferred by the voltage follower 21 which has a very high input impedance so that it does not discharge capacitor 19 to the electronic switch 22. In order to make use of the other half of the seismic signal, the inverted square wave 16b is passed through circuit 15b in the same manner that square wave 16a was passed through circuit 15a before being fed into electronic switch 22. This switch is alternately switched from the output of voltage follower 21 to the output of voltage follower 23 of network 15b by the square waves 19a and 24a. The output signal 25a from the electronic switch 22 represents the cycle breadth of the seismic signal in positive going pulses with respect to zero signal level. This signal is amplified by amplifier 25 and impedance matched to drive the cycle breadth galvanometer 30. The amplitude voltage is fed directly to the amplitude galvanometer 31 from amplifier 13 as shown.

Figure 3:
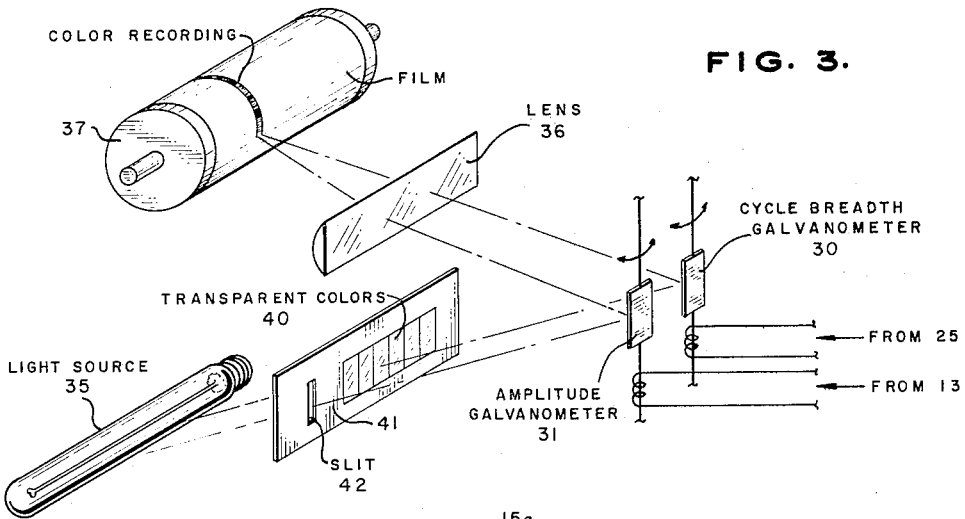
FIG. 3 is a schematic representation of the optical system for recording the signals.

Referring to FIG. 3, the cycle breadth voltage which varies with cycle breadth and the amplitude voltage which varies with amplitude are supplied to the separate moving coil galvanometers 30 and 31, respectively, which galvanometers are both focused on a white light source 35 and adjusted to impinge overlaid images of this light source on a common area of color film through a condensing lens 36 which focuses the light from the galvanometers. The film is affixed to a drum 37 which is moving at constant speed in respect to the magnetically recorded information that is being analyzed.

An array of different, transparent colors 40 (stacked mask) are placed between the light source and the cycle breadth galvanometer 30 in a manner such that changes in cycle breadth voltage will produce changes in the color of light striking the color film in blocks. An opaque strip 41 with a single narrow transparent slit 42 is positioned between the amplitude galvanometer 31 and light source 35 in a manner such that at zero voltage, no signal, a beam of clear white light is impinged on the film of such an intensity as to wipe out the colored lights supplied by the cycle breadth galvanometer 30. With increases in amplitude voltage, the amplitude galvanometer 31 is moved away from the clear slit and diminishing amounts of white light are mixed with the colored light from the cycle breadth galvanometer 30. At maximum amplitude no white light is impinged by the amplitude galvanometer on the film and a clear color, undiluted by white light supplied by the cycle breadth galvanometer 30 is recorded.

The recording method was described herein as a single, photographic trace recording; however, this method is readily adapted to multiple channel recording by providing suitable shielding for each separate channel. U.S. Patent No. 3,011,856, entitled "Automatic Plotter," issued Dec. 5, 1961, to C. C. Palmer and R. R. Briscoe shows and describes apparatus for channeling separate traces that would be suitable for this purpose.

Having described the method, apparatus, objects and advantages of the invention, we claim:

1. A system for recording seismic signals as photographic traces comprising:
   a light-sensitive recording means; and
   means capable of projecting light simultaneously in colors and white light onto said light-sensitive means in a manner such that the color of said photographic trace recorded varies in proportion to variation in the cycle breadth of said seismic signals and the area of said photographic trace recorded varies in response to variations in amplitude in said seismic signals, said photographic trace decreasing in area with decreasing amplitude and vice versa.

2. A system for recording seismic signals as photographic traces comprising:
   a light-sensitive recording means;
   means adapted to project light onto said light-sensitive means in colors which vary in response to variations in the cycle breadth of said seismic signals; and
   means capable of simultaneously projecting white light onto said light-sensitive means which white light decreases in intensity in response to increases in amplitude of said seismic signals to thereby overlay said projected color image with white light in a manner such that the area occupied by said projected color image on said light-sensitive means is increased and decreased in response to variations in amplitude of said seismic signals.

3. A system for photographically recording seismic signals comprising:
   a light-sensitive recording means movable in one direction;
   a light source;
   two reflecting means each angularly movable on an axis extending in a direction parallel to said one direction in response to electrical signals generated in response to different parameters of said seismic signal, one of said reflecting means being movable in response to the cycle breadth of said seismic signal and the other of said reflecting means being movable in response to the amplitude of said seismic signal;
   color scale means provided with a plurality of color blocks positioned between said light source and said one reflecting means;
   an opaque plate having a narrow, transparent slit positioned between said light source and said other reflecting means;
   both of said reflecting means being focused on a common area of said reflecting means;
   first circuit means adapted to form said cycle breadth signal and transmit it to said one reflecting means; and
   second circuit means adapted to transmit said amplitude signal to said other reflecting means.

References Cited by the Examiner
UNITED STATES PATENTS

| | | | |
|---|---|---|---|
| 2,976,106 | 3/1961 | Piety | 346—109 |
| 3,011,856 | 12/1961 | Palmer et al. | 346—109 |
| 3,048,846 | 8/1962 | Martin | 346—1 |
| 3,050,731 | 8/1962 | Usdin | 346—1 |
| 3,072,907 | 1/1963 | Boucher | 346—1 |
| 3,129,999 | 4/1964 | Brown et al. | 346—109 |
| 3,142,528 | 7/1964 | Stafford et al. | 346—109 |
| 3,143,389 | 8/1964 | Dransfield | 346—109 |
| 3,158,428 | 11/1964 | Lebourg | 346—46 |

LEO SMILOW, *Primary Examiner.*

LEYLAND M. MARTIN, *Examiner.*